(12) United States Patent
Gou

(10) Patent No.: US 9,779,521 B2
(45) Date of Patent: Oct. 3, 2017

(54) GRAVITY POINT DRAWING METHOD

(71) Applicant: ADOBE SYSTEMS INCORPORATED, San Jose, CA (US)

(72) Inventor: Dongfang Gou, Beijing (CN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 353 days.

(21) Appl. No.: 14/292,353

(22) Filed: May 30, 2014

(65) Prior Publication Data

US 2014/0375655 A1 Dec. 25, 2014

Related U.S. Application Data

(63) Continuation of application No. PCT/CN2013/077797, filed on Jun. 24, 2013.

(51) Int. Cl.
*G06T 11/20* (2006.01)

(52) U.S. Cl.
CPC .................. *G06T 11/203* (2013.01)

(58) Field of Classification Search
CPC .................................................... G06T 11/203
See application file for complete search history.

(56) References Cited

U.S. PATENT DOCUMENTS

| | | | | |
|---|---|---|---|---|
| 5,291,186 A | * | 3/1994 | Martinez | G06K 15/02 345/467 |
| 5,371,845 A | * | 12/1994 | Newell | G06F 3/04812 345/619 |
| 5,434,959 A | * | 7/1995 | Von Ehr, II | G06T 11/203 345/441 |
| 5,524,182 A | * | 6/1996 | Chari | G06K 9/6828 358/1.11 |
| 5,636,338 A | * | 6/1997 | Moreton | G06T 17/30 345/420 |
| 5,673,371 A | * | 9/1997 | Koopman | G06K 15/02 345/467 |
| 5,764,936 A | * | 6/1998 | Evans | G06F 3/0481 715/861 |

(Continued)

FOREIGN PATENT DOCUMENTS

| | | |
|---|---|---|
| CN | 101996515 A | 3/2011 |
| CN | 102880593 A | 1/2013 |

OTHER PUBLICATIONS

PCT International Search Report dated Jul. 4, 2013 regarding PCT Appln. No. PCT/CN2013/077797 9 pages.

(Continued)

*Primary Examiner* — Devona E Faulk
*Assistant Examiner* — Charles L Beard
(74) *Attorney, Agent, or Firm* — Shook, Hardy & Bacon L.L.P.

(57) ABSTRACT

A system and method of a gravity point drawing that simulate a physical model to draw or modify vector curves. A node is identified in a drawing of a graphical application. A size of a predefined space around the node and an intensity value associated with the node are determined. The intensity value affects the curvature of a vector curve in the predefined space. The vector curve is generated in the predefined space. The curvature of the vector curve is based on the size of the predefined space and the intensity value associated with the node in the drawing.

20 Claims, 21 Drawing Sheets

(56) References Cited

U.S. PATENT DOCUMENTS

| | | | | |
|---|---|---|---|---|
| 5,796,409 A * | 8/1998 | Hersch | B41B 19/00 | 345/468 |
| 5,825,941 A * | 10/1998 | Linford | G06T 11/203 | 382/128 |
| 5,883,986 A * | 3/1999 | Kopec | G06K 9/72 | 382/155 |
| 5,889,928 A * | 3/1999 | Nakamura | H04N 1/4078 | 358/1.9 |
| 6,154,221 A * | 11/2000 | Gangnet | G06T 11/203 | 345/442 |
| 6,232,987 B1 * | 5/2001 | Choi | G06K 15/02 | 345/467 |
| 6,256,038 B1 * | 7/2001 | Krishnamurthy | G06T 11/203 | 345/419 |
| 6,268,871 B1 * | 7/2001 | Rice | G06T 11/203 | 345/442 |
| 6,292,583 B1 * | 9/2001 | Maruo | G01N 21/9501 | 348/126 |
| 6,297,798 B1 * | 10/2001 | Evans | G06F 3/0481 | 715/856 |
| 6,298,155 B1 * | 10/2001 | Mitsunaga | G06T 11/203 | 382/190 |
| 6,441,823 B1 * | 8/2002 | Ananya | G06T 11/203 | 345/442 |
| 6,459,439 B1 * | 10/2002 | Ahlquist, Jr. | G06T 11/203 | 345/619 |
| 6,498,608 B1 * | 12/2002 | Dresevic | G06F 17/214 | 345/467 |
| 6,622,085 B1 * | 9/2003 | Amita | G01C 21/32 | 340/990 |
| 6,784,896 B1 * | 8/2004 | Perani | G06T 11/001 | 345/423 |
| 6,850,239 B2 * | 2/2005 | Mochizuki | G06T 11/203 | 345/419 |
| 7,129,960 B2 * | 10/2006 | Ohkubo | G06T 11/20 | 345/619 |
| 7,196,707 B2 * | 3/2007 | Davignon | G06T 11/203 | 345/442 |
| 7,218,326 B1 * | 5/2007 | Bogues | G06T 11/203 | 345/441 |
| 7,236,174 B2 * | 6/2007 | Stamm | G06K 9/44 | 345/467 |
| 7,496,416 B2 * | 2/2009 | Ferguson | G06T 11/203 | 345/442 |
| 7,535,471 B1 * | 5/2009 | Mansfield | G06T 11/203 | 345/467 |
| 7,822,230 B2 * | 10/2010 | Fujimaki | G01B 11/03 | 345/442 |
| 7,884,834 B2 * | 2/2011 | Mouilleseaux | G06F 3/04845 | 345/441 |
| 7,928,983 B2 * | 4/2011 | Pedersen | G06T 11/001 | 345/441 |
| 8,068,106 B1 * | 11/2011 | Yhann | G06T 11/20 | 345/442 |
| 8,587,609 B1 * | 11/2013 | Wang | G06T 11/203 | 345/467 |
| 8,854,375 B2 * | 10/2014 | Cheng | G06T 11/203 | 345/467 |
| 9,317,944 B2 * | 4/2016 | Lampinen | G06T 11/203 | |
| 9,418,465 B2 * | 8/2016 | Rubin | G06T 13/40 | |
| 9,620,086 B1 * | 4/2017 | Joshi | G09G 5/28 | |
| 9,626,101 B2 * | 4/2017 | Nguyen Thien | G06F 3/016 | |
| 2002/0061125 A1 * | 5/2002 | Fujii | G06K 9/00067 | 382/125 |
| 2003/0156123 A1 * | 8/2003 | Steed | G06T 11/203 | 345/619 |
| 2004/0095351 A1 * | 5/2004 | Ananya | G06T 11/203 | 345/442 |
| 2004/0230931 A1 * | 11/2004 | Barbee, III | G06F 17/5072 | 716/122 |
| 2005/0052460 A1 * | 3/2005 | Davignon | G06T 11/203 | 345/442 |
| 2005/0128211 A1 * | 6/2005 | Berger | G06T 19/00 | 345/582 |
| 2005/0184991 A1 * | 8/2005 | Stamm | G06T 11/203 | 345/467 |
| 2006/0193018 A1 * | 8/2006 | Ito | H04N 1/6033 | 358/518 |
| 2008/0161124 A1 * | 7/2008 | Kajita | A63B 53/0466 | 473/330 |
| 2008/0170074 A1 * | 7/2008 | Beier | G01C 21/32 | 345/442 |
| 2008/0252645 A1 * | 10/2008 | Mouilleseaux | G06F 3/04845 | 345/442 |
| 2008/0252660 A1 * | 10/2008 | Masumoto | G06T 11/203 | 345/642 |
| 2008/0297514 A1 * | 12/2008 | Pedersen | G06T 11/001 | 345/442 |
| 2009/0051680 A1 | 2/2009 | Miura et al. | | |
| 2009/0141038 A1 * | 6/2009 | Newaskar | G06T 11/203 | 345/589 |
| 2009/0276194 A1 * | 11/2009 | Kidera | G06T 11/203 | 703/1 |
| 2009/0297064 A1 * | 12/2009 | Koziol | G06T 11/203 | 382/302 |
| 2011/0025693 A1 * | 2/2011 | Merry | G06T 11/203 | 345/442 |
| 2011/0300936 A1 * | 12/2011 | Matsumiya | G06T 15/503 | 463/32 |
| 2012/0050294 A1 * | 3/2012 | Kallay | G06T 11/20 | 345/442 |
| 2012/0051654 A1 * | 3/2012 | Kitamura | G06T 7/0089 | 382/199 |
| 2012/0092340 A1 * | 4/2012 | Sarnoff | G06T 11/203 | 345/420 |
| 2012/0249521 A1 * | 10/2012 | Sakurai | H04N 1/6061 | 345/419 |
| 2012/0249569 A1 * | 10/2012 | Kokojima | G06T 11/203 | 345/582 |
| 2012/0287135 A1 * | 11/2012 | Pfeifle | G06T 11/203 | 345/442 |
| 2014/0340311 A1 * | 11/2014 | Holz | G06F 3/017 | 345/158 |
| 2014/0362089 A1 * | 12/2014 | Ording | G06F 3/048 | 345/442 |
| 2015/0063706 A1 * | 3/2015 | Lampinen | G06T 11/203 | 382/197 |
| 2015/0325016 A1 * | 11/2015 | Carr | G06T 11/203 | 345/442 |
| 2015/0371417 A1 * | 12/2015 | Angelov | G06Q 10/101 | 345/442 |
| 2016/0275206 A1 * | 9/2016 | Yu | G06F 17/50 | |

OTHER PUBLICATIONS

International Preliminary Report on Patentability dated Jan. 7, 2016 in Application No. PCT/CN2013/077797, 5 pages.

* cited by examiner

| IN PHYSICAL MODEL | CONVERSION TO GRAVITY POINT MODEL |
|---|---|
| $F = G \dfrac{m_1 m_2}{r^2}$ | $d = \sqrt{(P_x - G_x)^2 + (P_y - G_y)^2}$ |
| $F_x = F * Sin(a)$ | $a = \dfrac{m}{\frac{d}{r} * 100\%}$ |
| $F_y = F * Cos(a)$ | |
| $a_x = F_x / m$ | $a_x = a * sin(a)$ |
| $a_y = F_y / m$ | $a_y = a * cos(a)$ |

AFTER INVERSE OPTION ON $$d = \sqrt{(P_x - G_x)^2 + (P_y - G_y)^2}$$
$$a = \frac{m}{\frac{r-d}{r} * 100\%}$$
$$a_x = a * sin(a)$$
$$a_y = a * cos(a)$$

INTERSECT POINTS: $P_0, P_1$ $$P_{2_x} = P_{0_x}$$
$$P_{2_y} = G_y - \frac{G_y - P_{0_y}}{m*100\%}$$
$$B(t) = (1-t)^2 P_0 + 2t(1-t)P_1 + t^2 P_2, t \in [0, 1]$$

FIXED INTERSECT POINTS: $P_0, P_1$ $$P_{2_x} = G_x - \frac{G_x - \frac{P_{0_x} + P_{1_x}}{2}}{m * 100\%}$$

$$P_{2_y} = G_y - \frac{G_y - P_{0_y}}{m * 100\%}$$

$$B(t) = (1-t)^2 P_0 + 2t(1-t)P_1 + t^2 P_2, \; t \in [0, 1]$$

GRAVITY POINT DRAWING METHOD

CROSS-REFERENCE TO RELATED APPLICATIONS

This patent application is a continuation of, and claims priority to, International Application No. PCT/CN2013/077797, having an international filing date of Jun. 24, 2013 and entitled "Gravity Point Drawing Method," the entirety of which is hereby incorporated by reference.

TECHNICAL FIELD

The present application relates generally to the technical field of computer-generated drawings, and, in various embodiments, to systems and methods of gravity point drawing.

BACKGROUND OF THE INVENTION

Computer graphics applications can generate vector curves that can be manipulated to modify a shape of the curve. Bézier curves are parametric curves commonly used in computer graphics that provide a method to transfer geometric curves into a programming model. In vector graphics, Bézier curves are used to model smooth curves that can be scaled indefinitely using anchors and handles throughout the curves. Bézier curves are commonly defined in terms of four points. Two of these points are the endpoints, also referred to as anchor points. The other two points are known as control points, also referred to as handles, one associated with each anchor point. The curve extends from anchor point to anchor point. The line between an anchor point and its control point determines the slope, or derivative, of the curve at the anchor point. The further the control point is from the anchor point, the further the curve wants to go along the straight line before curving off towards the other anchor point.

As such, a user would have to manipulate multiple anchor points and control points in order to change the shape of the curves of a geometric shape. For example, FIG. 1A illustrates an original computer graphic shape 100. FIG. 1B illustrates a target computer graphic shape 102. FIG. 1C illustrates the original computer graphic shape 100 with anchor points 104 and control points 106 that the user would have to manipulate, one by one, to modify the curvature of the original computer graphic shape 100. Because each anchor point and control point has to be manually moved in a one by one fashion, inconsistency can be accumulated during the modification of the curvature. Further adjustment and correction of the anchor points and control points may be needed to generate the target computer graphic shape 102.

BRIEF DESCRIPTION OF THE DRAWINGS

Some embodiments of the present disclosure are illustrated by way of example and not limitation in the figures of the accompanying drawings, in which like reference numbers indicate similar elements and in which.

DETAILED DESCRIPTION

Figure 1A:
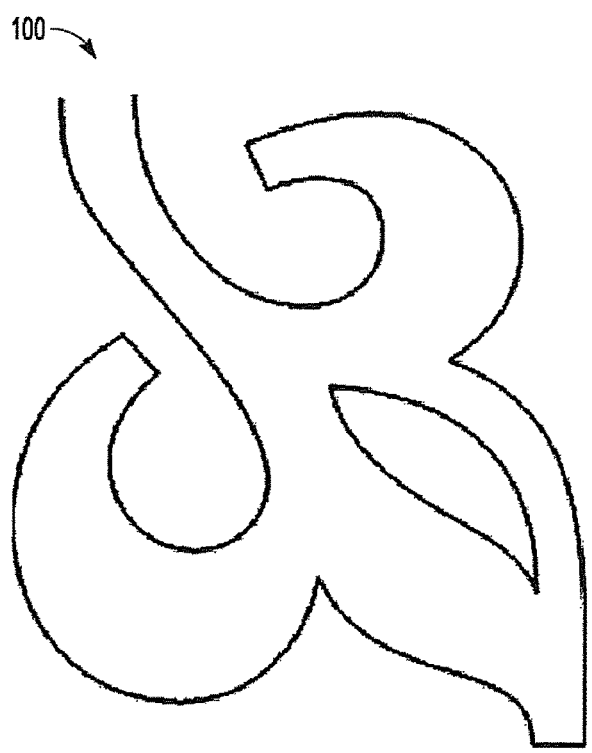
FIG. 1A illustrates a prior art example of an original geometric shape to be modified.
Figure 1B:
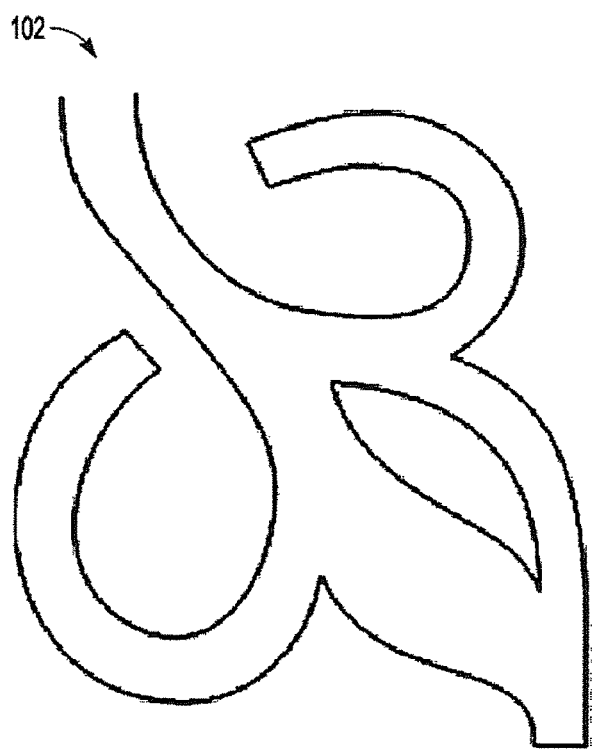
FIG. 1B illustrates a prior art example of a target geometric shape.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

The present disclosure describes a system and method of a gravity point drawing that simulates a physical model to draw and modify vector curves. In an example embodiment, a node is identified in a drawing of a graphical application.

The size of a predefined space around the node and an intensity value associated with the node are determined. The intensity value affects the curvature of a vector curve in the predefined space. The vector curve is generated in the predefined space. The curvature of the vector curve is based on the size of the predefined space and the intensity value associated with the node in the drawing.

In another example embodiment, the identification of the node selected by a user of the graphical application is received. The size of the predefined space around the node and the intensity value associated with the node are adjusted to modify the shape of the vector curve in the predefined space. The curvature of the vector curve is adjusted in the predefined space in the drawing based on the adjusted size of the predefined space and the adjusted intensity value associated with the node. The predefined space comprises a region with the node as the center of the region.

In another example embodiment, a vector curve is generated using a physical model vector curve. This physical model vector curve has a curvature based on the intensity value associated with the node and represents the measure of gravitational forces from the node in the drawing in a ray mode.

In another example embodiment, a vector curve is generated relative to a line segment between a first intersection point found between the existing curve and a perimeter of the predefined space and a second intersection point found between the existing curve and the perimeter of the predefined space in an arch mode.

In another example embodiment, points of an existing curve are shifted in the predefined space along an axis perpendicular to a line segment between a first intersection point found between the existing curve and a perimeter of the predefined space and a second intersection point found between the existing curve and the perimeter of the predefined space in an arch mode.

In another example embodiment, points of an existing curve are shifted in the predefined space along a radial axis of the node in an expand mode.

In another example embodiment, the vector curve is part of a curve in the drawing. The vector curve comprises a portion of the curve in the predefined space. The node in the drawing does not affect portions of the curve outside the predefined space.

In another example embodiment, the intensity value associated with the node is increased to increase the curvature of the vector curve towards the node in the predefined space. The intensity value associated with the node is decreased to decrease the curvature of the vector curve towards the node in the predefined space. The curvature of the vector curve is adjusted away from the node in the predefined space when the intensity value is negative.

In another example embodiment, a first node and a second node are identified in the drawing. A first size of a first predefined space around the first node and a first intensity value associated with the first node are determined. The first intensity value affects the curvature of a first vector curve in the first predefined space. A second size of a second predefined space around the second node and a second intensity value associated with the second node are determined. The second intensity value affects the curvature of a second vector curve in the second predefined space. The first predefined space intersects the second predefined space to form a common predefined space. A common vector curve is generated in the common predefined space. The curvature of the common vector curve is based on the size of the first and second predefined spaces and the intensity value associated with the first and second nodes.

In another example embodiment, a system comprises a memory coupled to a processor. The memory stores a graphical application. The processor comprises a node identifier, a node attribute module, and a vector curve generator. The node identifier identifies a node in a drawing of the graphical application. The node attribute module determines a size of a predefined space around the node and an intensity value associated with the node. The intensity value affects the curvature of a vector curve in the predefined space. The vector curve generator generates the vector curve in the predefined space. The curvature of the vector curve is based on the size of the predefined space and the intensity value associated with the node.

In another example embodiment, the node identifier is further configured to receive the identification of the node selected by a user of the graphical application, to adjust both the size of the predefined space around the node and the intensity value associated with the node needed to modify the shape of the vector curve in the predefined space, and to adjust the curvature of the vector curve in the predefined space in the drawing which is based on the adjusted size of the predefined space and the adjusted intensity value associated with the node.

In another example embodiment, the vector curve generator comprises a ray mode module configured to generate a physical model vector curve having a curvature based on the intensity value associated with the node as a representation of a measure of gravitational force from the node in the drawing.

In another example embodiment, the vector curve generator comprises an arch mode module configured to generate the vector curve relative to a line segment between a first intersection point found between the existing curve and a perimeter of the predefined space and a second intersection point found between the existing curve and the perimeter of the predefined space.

In another example embodiment, the vector curve generator comprises an arch mode module configured to shift points of an existing curve in the predefined space along an axis perpendicular to a line segment between a first intersection point found between the existing curve and a perimeter of the predefined space and a second intersection point found between the existing curve and the perimeter of the predefined space.

In another example embodiment, the vector curve generator comprises an arch mode module configured to shift points of an existing curve in the predefined space along a radial axis of the node.

In another example embodiment, the node attribute module is configured to increase the intensity value associated with the node that increases a curvature of the vector curve towards the node in the predefined space, and to decrease the intensity value associated with the node that decreases a curvature of the vector curve towards the node in the predefined space. The vector curve generator is configured to adjust the curvature of the vector curve away from the node in the predefined space when the intensity value is negative.

In another example embodiment, the node identifier is configured to identify a first node and a second node in the drawing. The node attribute module is configured to determine a first size of a first predefined space around the first node, and a first intensity value associated with the first node. The first intensity value affects a curvature of a first vector curve in the first predefined space. The node attribute model is also configured to determine a second size of a second predefined space around the second node, and a second intensity value associated with the second node. The second intensity value affects a curvature of a second vector curve in the second predefined space. The first predefined space intersects the second predefined space to form a common predefined space. The vector curve generator is configured to generate a common vector curve in the common predefined space. A curvature of the common vector curve is based on the sizes of the first and second predefined spaces and the intensity value associated with the first and second nodes in the drawing.

In another example embodiment, a non-transitory machine-readable storage device may store a set of instructions that, when executed by at least one processor, causes the at least one processor to perform the method operations discussed within the present disclosure.

Figure 2A:
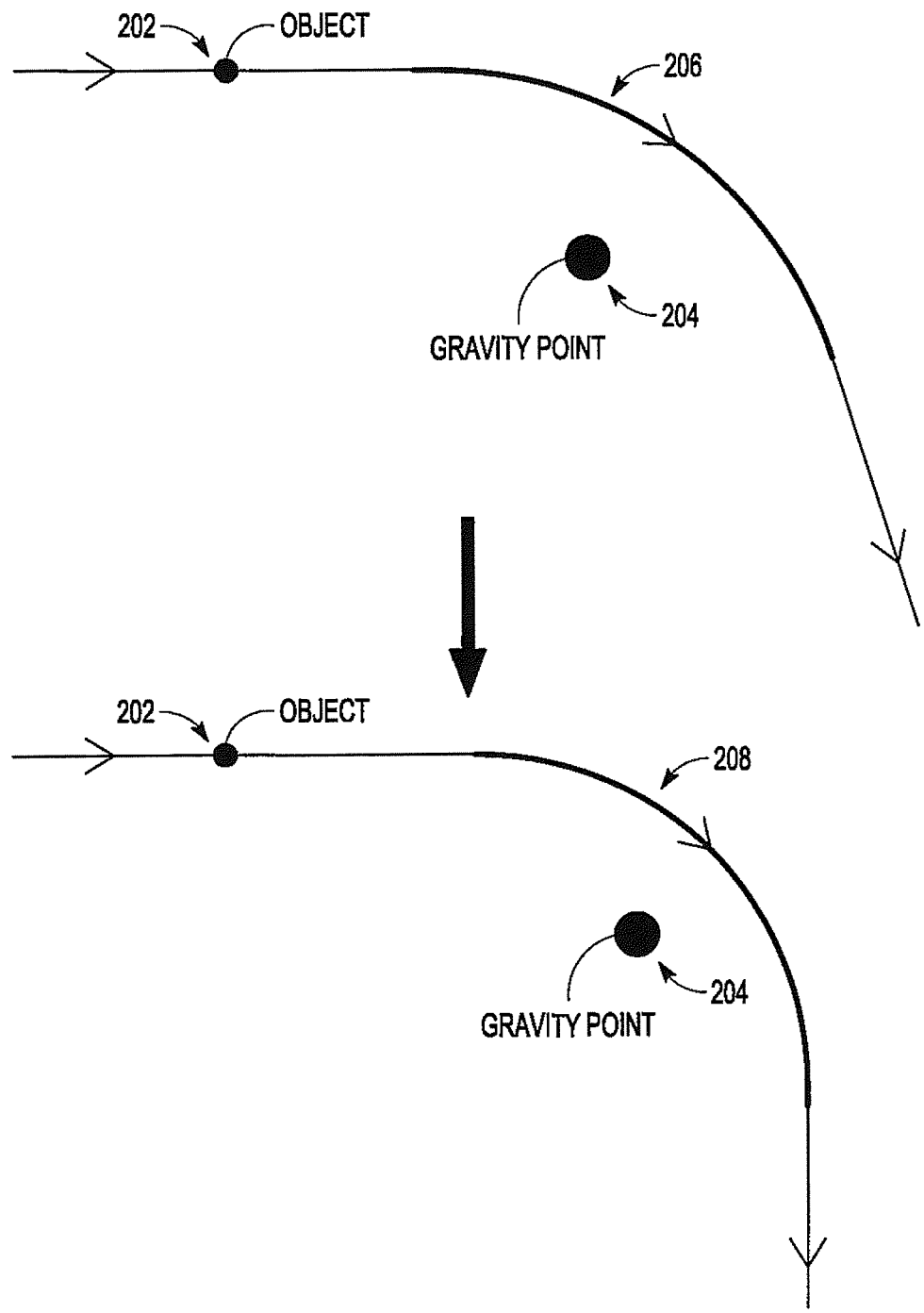
FIG. 2A illustrates an example embodiment of a modification process of a vector curve.

FIG. 2A illustrates an example embodiment of a ray mode modification process of a vector curve. The ray mode includes a single fixed point on straight line and is based on classical physics models. For example, an object 202 orbits a gravitational point (e.g., gravity point 204). As the object 202 moves closer to the gravity point 204, it may be affected. The object 202 may change its direction slowly. The path of the object 202 generates a smooth curve 206.

Figure 2B:
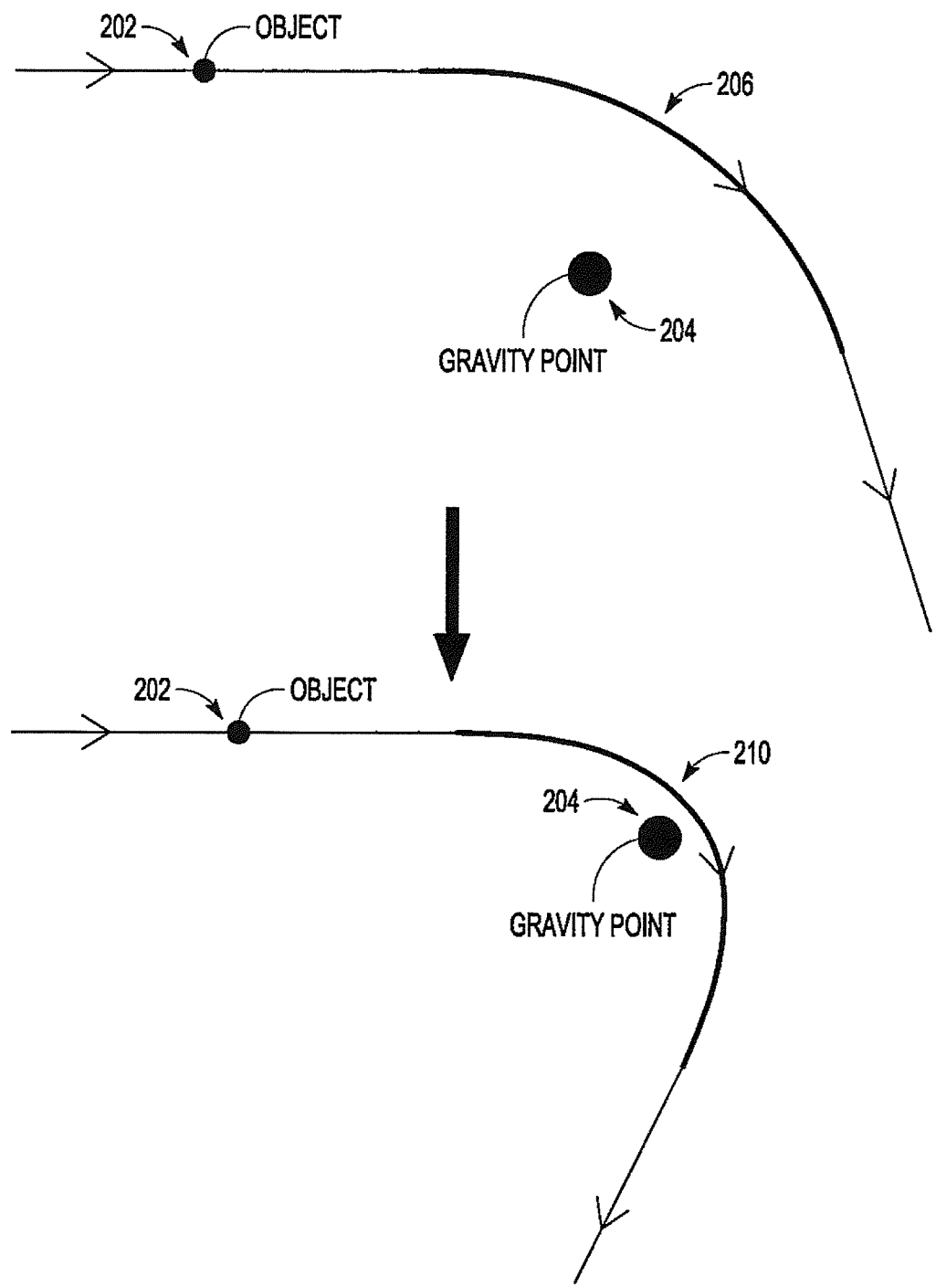
FIG. 2B illustrates another example embodiment of a modification process of a vector curve.

The variables, mass and distance, can affect the curvature of the path. For example, increasing the mass of the gravity point 204 may generate a sharp curve 208 for the object 202. Inversely, reducing the relative distance between the object 202 and the gravity point 204 may generate an even sharper curve 210 as illustrated in FIG. 2B. As such, two example parameters in the gravity point drawing method used to control the curves include the intensity of the gravity point 204 and the relative distance between the object 202 and the gravity point 204.

Figure 3A:
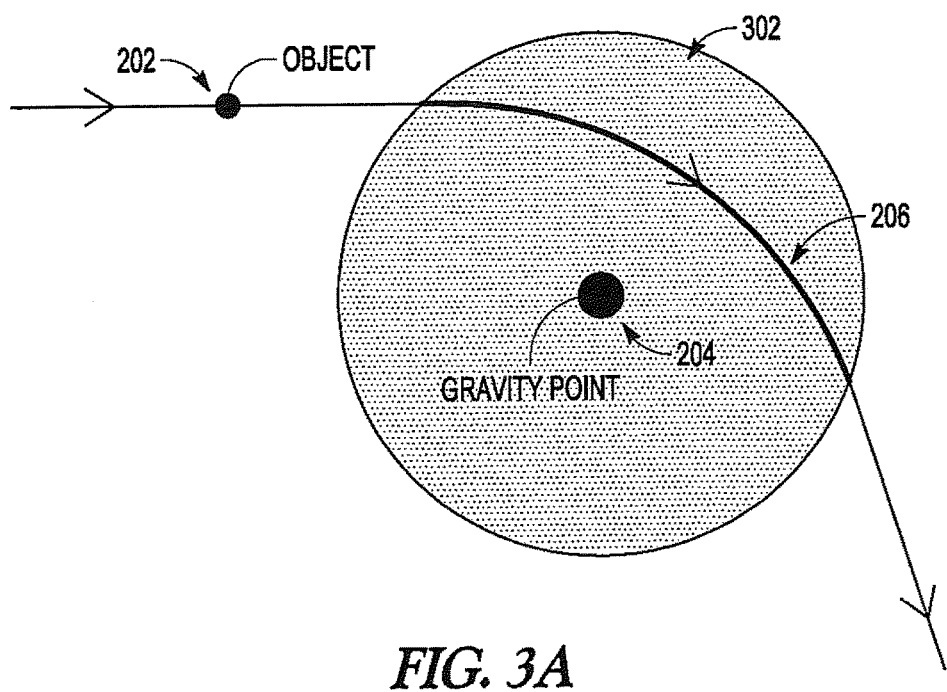
FIG. 3A illustrates an example embodiment of a model for a ray mode modification process of a vector curve.

In a physical model, the affected range of gravity force is unlimited. In other words, as the distance between the object 202 and the gravity point 204 increases, the gravity force between the object 202 and the gravity point 204 approaches zero. In an example embodiment of the gravity point drawing method, a parameter is generated to limit the affected range. FIG. 3A illustrates a predefined space 302 that can be adjusted to limit the effect of the gravity point 204 on the object 202. As such, the path of the object 202 is not affected outside the predefined space 302. In one embodiment, the predefined space 302 comprises a region with the gravity point 204 as the center of the region. Similarly, the path of the object 202 is affected by the gravity point 204 only within the predefined space 302.

Figure 3B:
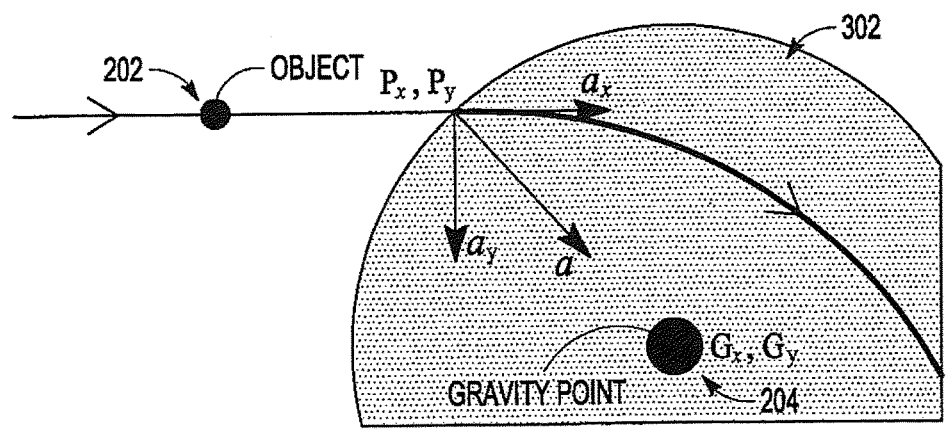
FIG. 3B illustrates another example embodiment of a model for a ray mode modification process of a vector curve.

FIG. 3B illustrates a model for a ray mode modification process of a vector curve. When the object 202 moves into the predefined space 302 at geographic location ($P_x$, $P_y$), the object 202 starts to gain acceleration by gravity forces ($G_x$, $G_y$) from the gravity point 204. The acceleration of the object 202 at geographic location ($P_x$, $P_y$) may be separated into two directional components: a first direction component $a_x$ along the original velocity, and a second direction component $a_y$ vertical to the first direction component $a_x$. The vertical acceleration $a_y$ changes the path of the object 202. As long as the object 202 stays within the predefined space 302, the path of the object 202 generates a curve. The curvature may be affected by parameters as further described below.

Figure 3C:
FIG. 3C illustrates an example embodiment of an algorithm for the ray mode modification process of the vector curve of FIG. 3B.

FIG. 3C illustrates an example embodiment of an algorithm for the ray mode modification process of the vector curve of FIG. 3B. An example of the ray mode modification process of a vector curve is illustrated in FIG. 3C where the square of the mass "m" of the object 202 makes the acceleration nonlinear. Increasing the mass "m" of the object 202 adds acceleration "a" evenly. Reducing the relative distance "d" between the object 202 and the gravity point 204 adds different acceleration based on the position of each point along the path of the object 202.

Figures 4A, 4B:
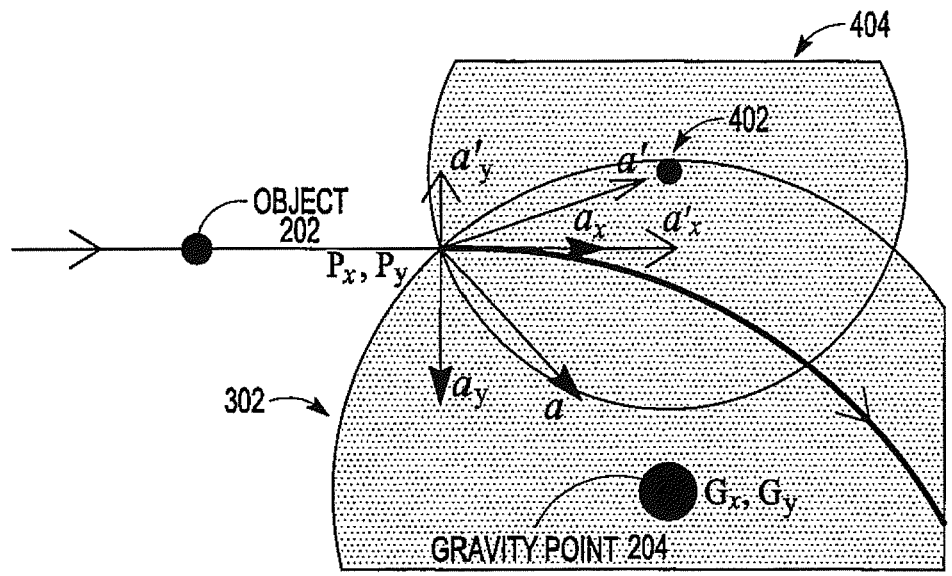
FIG. 4A illustrates an example embodiment of a model for a ray mode modification process of a vector curve.
FIG. 4B illustrates an example embodiment of an algorithm for a ray mode modification process of the vector curve of FIG. 4A.

The object 202 may move into an area covered by multiple gravity points. For example, FIG. 4A illustrates a model for a ray mode modification process of a vector curve for the object 202. The object 202 is affected by two gravity points 204 and 402 when the object 202 is in the corresponding predefined space 302 and 404 of gravity points 204 and 402. The acceleration (a and a') from each gravity point 204 and 402 is broken down into a horizontal direction ($a_x$ and $a'_x$) and a vertical direction ($a_y$ and $a'_y$). The composite direction is then calculated based on the combined original directions ($a_x$ and $a'_x$) and vertical directions ($a_y$ and $a'_y$).

In another embodiment, the intensity associated with the gravity point 204 may be reversed. This reverse gravity point method may be referred to as an inverse option. For example, the distribution of gravity force can be inversed inside the predefined space 302. In other words, points with more distance from the gravity point 204 receive more gravity force than points closer to the gravity point 204. FIG. 4B illustrates an example embodiment of an algorithm for the reverse gravity point method.

Figure 5:
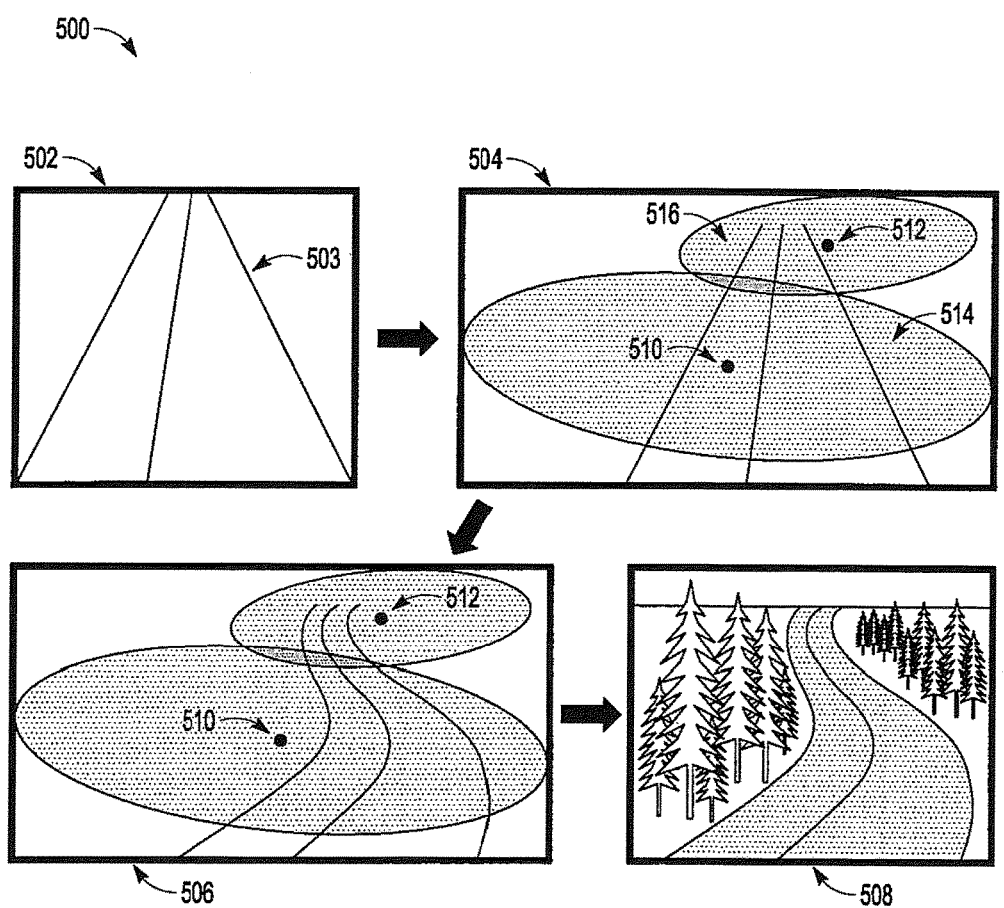
FIG. 5 illustrates an example embodiment of a sequence for generating vector curves using a ray mode modification process.

FIG. 5 illustrates an example embodiment of a sequence 500 for generating vector curves using a ray mode modification process as previously described. In drawing 502, three straight lines 503 are drawn. In drawing 504, gravity points 510 and 512 are placed within their respective predefined spaces, 514 and 516. The shape or area of the predefined spaces 514 and 516 can be adjusted to change the affected range. The mass of (or intensity associated with) the gravity points 510 and 512 may also be adjusted. For example, a positive mass would represent an attractive force while a negative mass would represent a repulsive force. Drawing 506 illustrates the effects of the gravity point drawing method on the three lines 503. Drawing 508 illustrates an example of an end result of a computer graphics drawing using the gravity point drawing method.

Figure 1C:
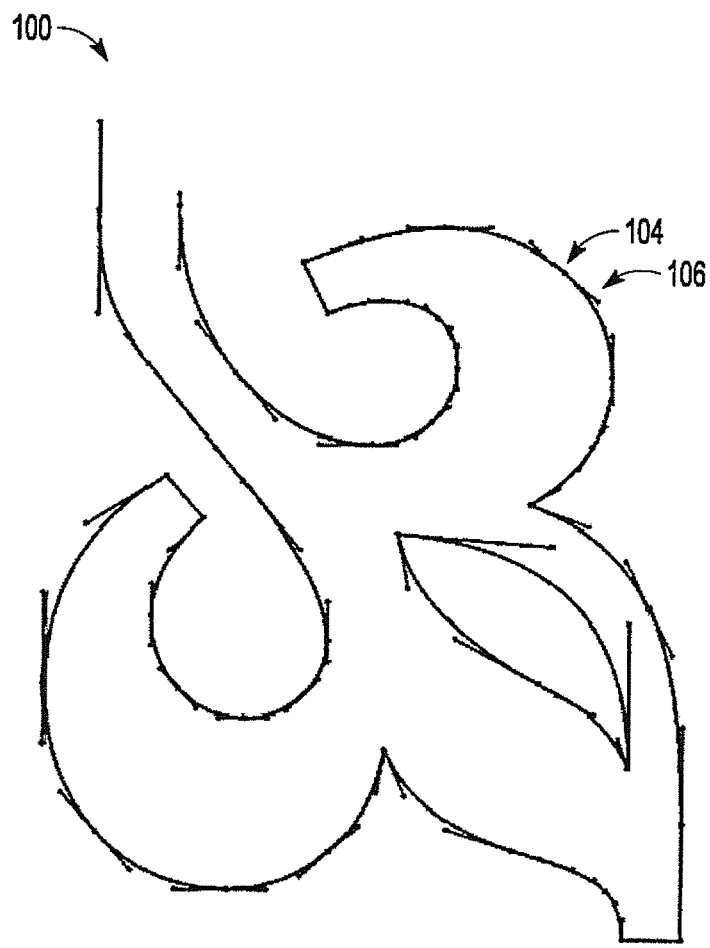
FIG. 1C illustrates a prior art example of anchor points and handles to be manipulated.

In contrast to the traditional anchors and handles based methods, the gravity point drawing method is easier to use. Adjusting one gravity point (e.g., 510, 512) in the gravity point drawing method would be the equivalent of adjusting multiple anchor points and handles as illustrated in the example of FIG. 1C. Furthermore, the relative curvature of the paths is consistently maintained between the three lines 503 in FIG. 5 when adjusting the gravity points 510 and 512.

Figures 6A, 6B:
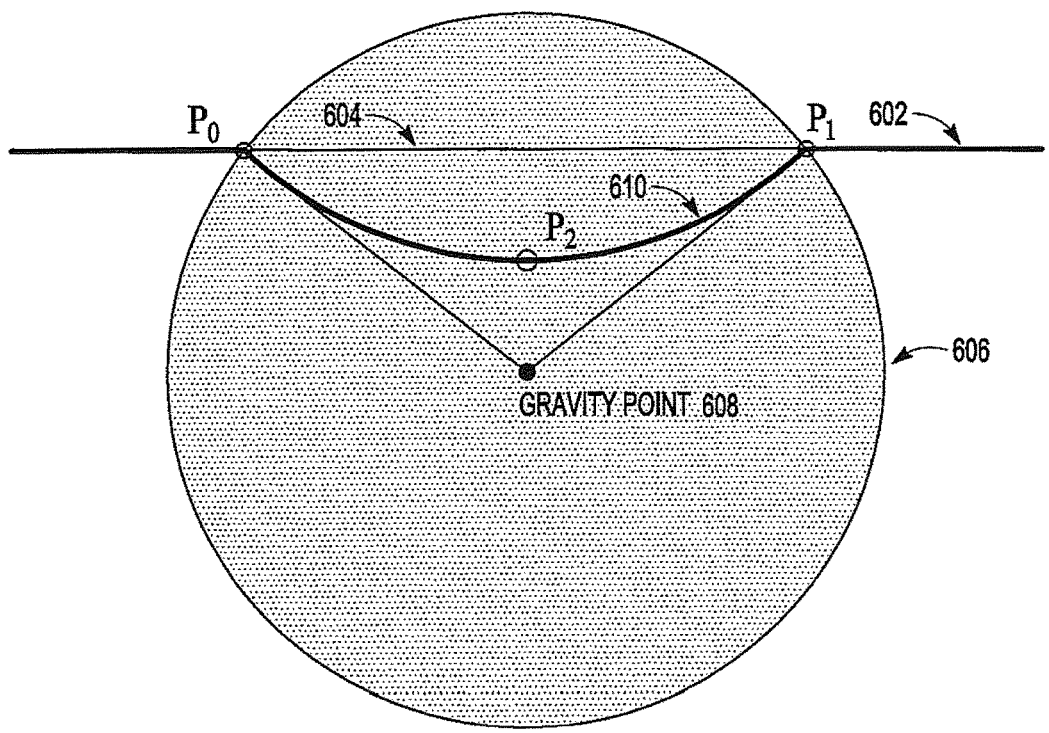
FIG. 6A illustrates an example embodiment of a model for an arch mode modification process of a new vector curve.
FIG. 6B illustrates an example embodiment of an algorithm for an arch mode modification process of the vector curve of FIG. 6A.

In accordance with another example embodiment, the gravity point drawing method includes an arch mode. FIG. 6A illustrates an example of an arch mode where two points $P_0$ and $P_1$ are fixed on a single straight line 602. The portion 604 of the straight line 602 is within a predefined space 606 and is therefore affected by a gravity point 608 associated with the predefined space 606.

In the arch mode, the acceleration as previously described is not a parameter in this case. The arch mode produces a vector curve 610 defined by three points: $P_0$, $P_1$, and $P_2$. $P_0$ and $P_1$ are two points of intersection between the straight line 602 and the predefined space 606 which are associated with the gravity point 608. $P_2$ is a point along the vector curve 610 closest to the gravity point 608. In other words, $P_0$, $P_1$, and $P_2$ make up a Quadratic Bézier curve. FIG. 6B illustrates an example embodiment of an algorithm for the arch mode modification process of the vector curve of FIG. 6A, where $P_{2_x}$ and $P_{2_y}$ represent geographic coordinates of the point $P_2$, and B(t) represents the offset relative to the portion 604 of the straight line 602 to generate the vector curve 610.

Figures 7A, 7B:
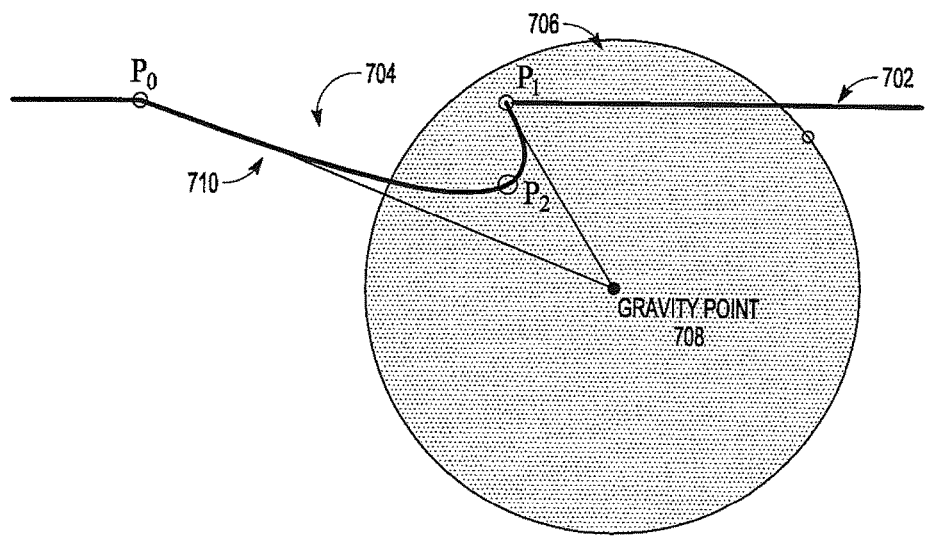
FIG. 7A illustrates another example embodiment of a model for an arch mode modification process of a new vector curve.
FIG. 7B illustrates an example embodiment of an algorithm for an arch mode modification process of the vector curve of FIG. 7A.

FIG. 7A illustrates another example embodiment of a model for an arch mode modification process of a new vector curve 710. The arch mode produces a new vector curve 710 defined by three points: $P_0$, $P_1$, and $P_2$. FIG. 7A illustrates an example of an arch mode where two points, $P_0$ and $P_1$, are fixed on a single straight line 702. The portion 704 of the line 702 between $P_0$ and $P_1$ is within a predefined space 706 and is, therefore, affected by a gravity point 708 associated with the predefined space 706. Because points $P_0$ and $P_1$ are user-defined and do not correspond to intersection points between the straight line 702 and the predefined space 706, the arch mode in FIG. 7A illustrates an asymmetric mode where the intersection points $P_0$ and $P_1$ are not defined by the predefined space 706, and the horizontal movement of the gravity point 708 distorts the arch shape of the new vector curve 710 between intersection points $P_0$ and $P_1$.

FIG. 7B illustrates an example embodiment of an algorithm for the arch mode modification process of the vector curve 710 of FIG. 7A, where $P_{2_x}$ and $P_{2_y}$ represent geographic coordinates of the point $P_2$, and B(t) represents the offset relative to the portion 704 of the straight line 702 to generate the vector curve 710.

Figure 8A:
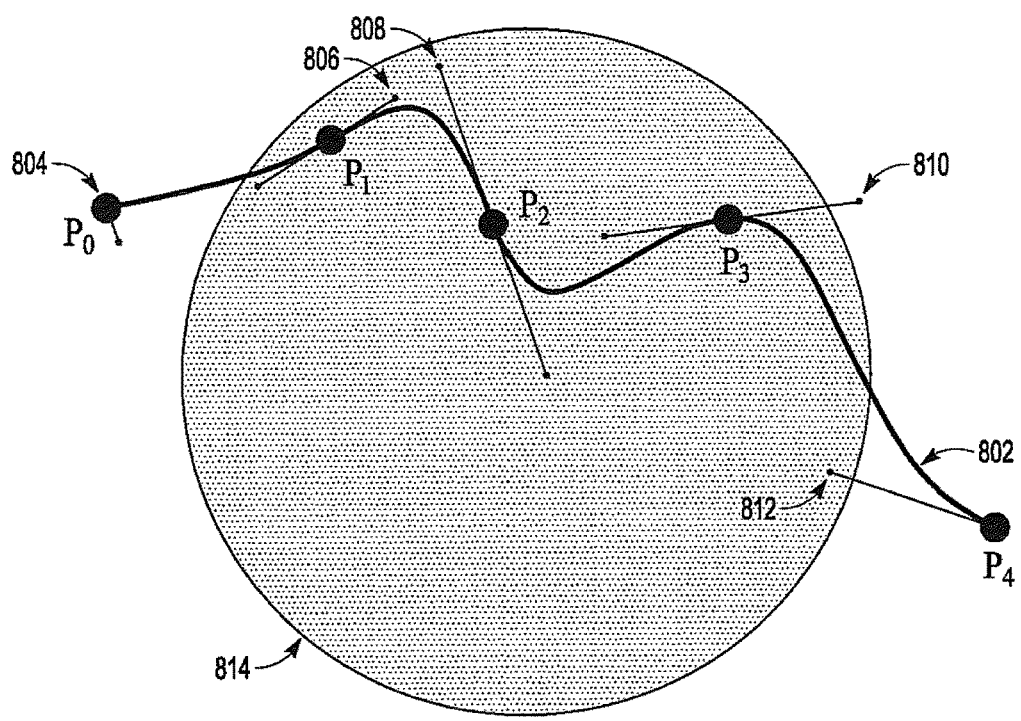
FIGS. 8A-8F illustrate example embodiments of a model for an arch mode modification process of an existing vector curve.

FIGS. 8A-8E illustrate example embodiments of a model for an arch mode modification process for existing vector curves. FIG. 8A illustrates an example of a vector curve 802 with multiple anchor points $P_0$, $P_1$, $P_2$, $P_3$, and $P_4$, and respective handles 804, 806, 808, 810, and 812. In order to change the shape of the vector curve 802, anchor points $P_0$, $P_1$, $P_2$, $P_3$, $P_4$, and respective handles 804, 806, 808, 810, and 812 would all have to be manipulated in a traditional method.

Figure 8B:
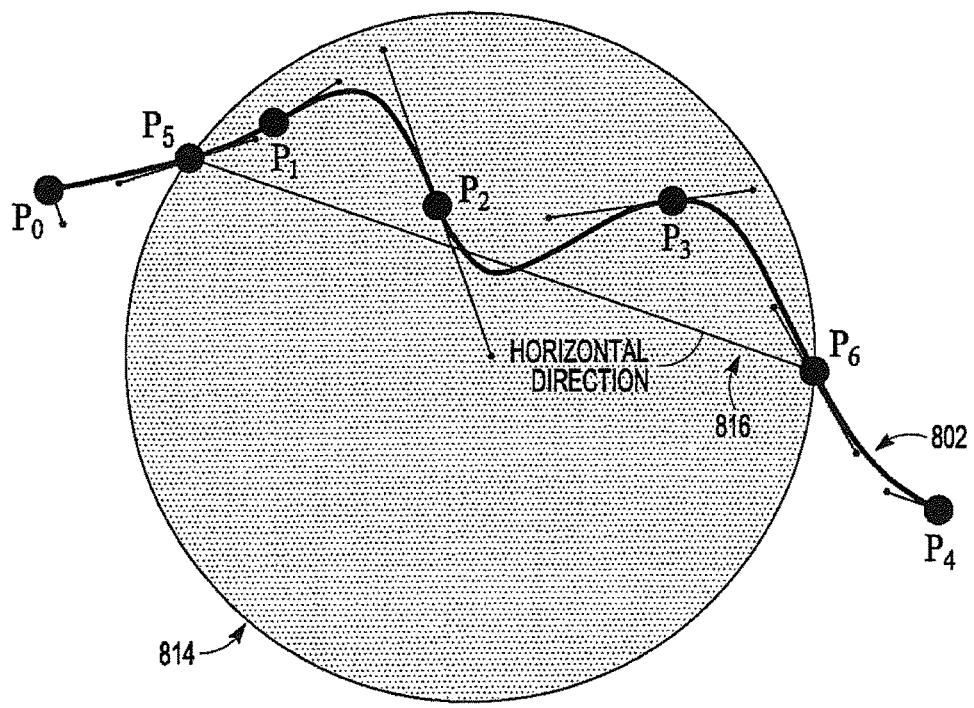

FIG. 8B illustrates where the example vector curve 802 intersects a predefined space 814 between two intersection points: $P_5$ and $P_6$. The two intersection points $P_5$ and $P_6$ are added on the vector curve 802 as new anchor points, in addition to anchor points $P_0$, $P_1$, $P_2$, $P_3$, and $P_4$. A straight line 816 between the two intersection points $P_5$ and $P_6$ forms the direction of a horizontal line. Anchor points $P_0$, $P_1$, $P_2$, $P_3$, and $P_4$ are located inside the predefined space 814.

Figure 8C:
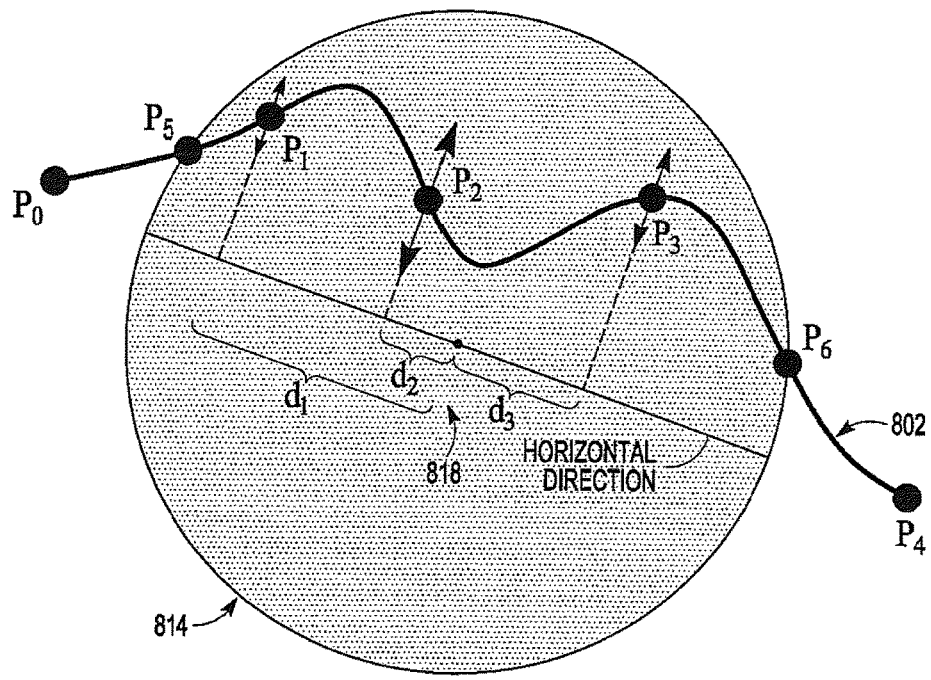

FIG. 8C illustrates how the relative horizontal distances between each anchor point to the gravity point 818 associated with the predefined space 814 decides the weight of vertical movement. For example, anchor point $P_1$ has a horizontal distance $d_1$ from the gravity point 818. Anchor point $P_2$ has a horizontal distance $d_2$ from the gravity point 818. Anchor point $P_3$ has a horizontal distance $d_3$ from the gravity point 818. Because the horizontal distance $d_1$ is greater than the horizontal distance $d_2$, the vertical displacement of anchor point $P_2$ is greater than the vertical displacement of anchor point $P_1$. Similarly, because the horizontal distance $d_3$ is greater than the horizontal distance $d_2$, the vertical displacement of anchor point $P_2$ is still greater than the vertical displacement of anchor point $P_3$.

Figure 8D:
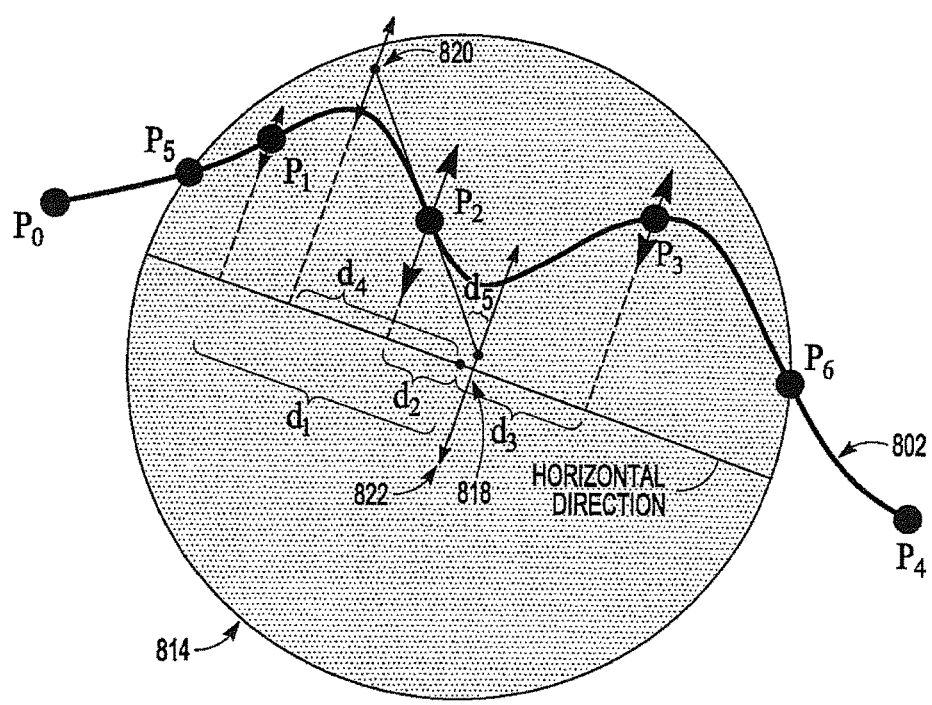

FIG. 8D illustrates how the relative horizontal distance between each control point to the gravity point 818 decides the weight of vertical movement. For example, control point 820 has a horizontal distance $d_4$ from the gravity point 818. Control point 822 has a horizontal distance $d_5$ from the gravity point 818. Because the horizontal distance $d_4$ is greater than the horizontal distance $d_5$, the vertical displacement of control point 822 is much greater than the vertical displacement of control point 820.

Figure 8E:
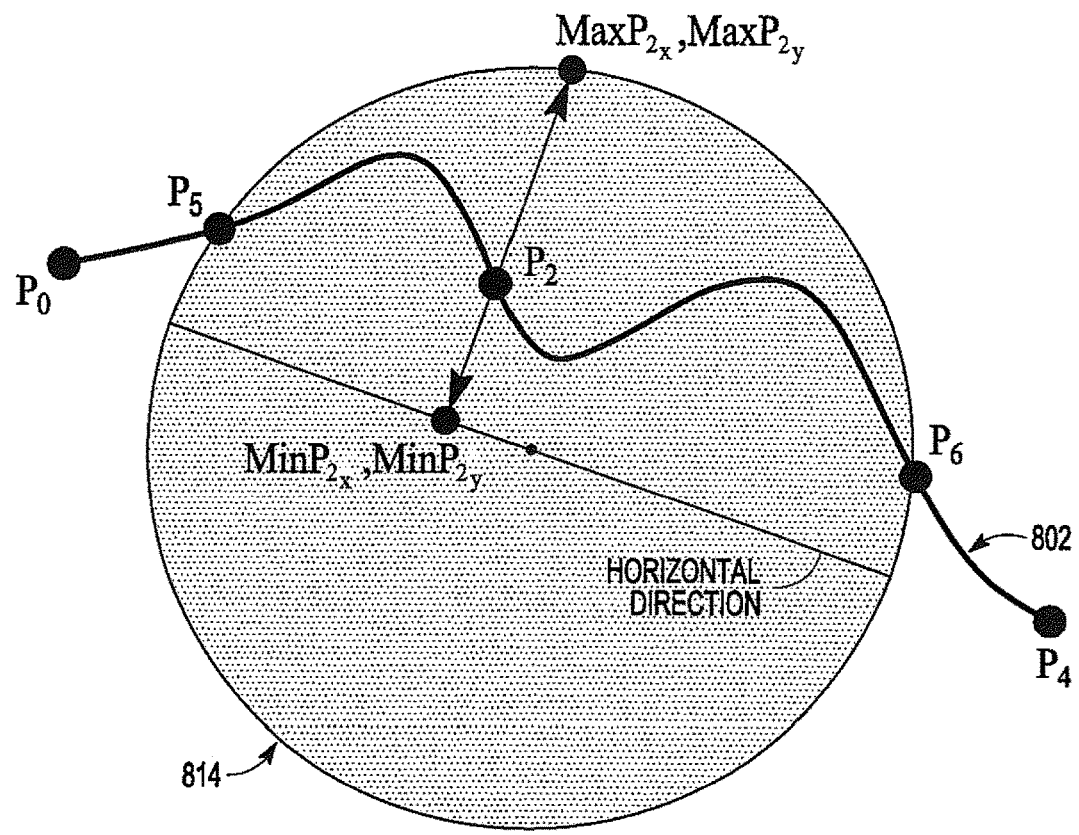

FIG. 8E illustrates a mathematical model for vertical displacement of points along the existing vector curve 802. The maximum vertical displacement of point $P_2$ is represented by $MaxP_{2_x}$ and $MaxP_{2_y}$. The minimum vertical displacement of point $P_2$ is represented by $MinP_{2_x}$ and $MinP_{2_y}$.

The original Bézier curve may be represented as:

$$B(t)=(P_0,P_1,P_2 \ldots P_{(n-2)},P_{(n-1)},P_n).$$

The intersection points may be represented by $P_{(n+1)}$ and $P_{(n+2)}$.

The direction of the horizontal line may be represented as:

$$\tag(a):(P_{(n+1)_x}-P_{(n+2)_x})/(P_{(n+1)_y}-P_{(n+2)_y}).$$

The vertical movement of the anchor points and control points may be represented as:

$$\text{New } P_{m_x}=P_{m_x}-(P_{m_x}-MinP_{m_x})*(m^2*100\%) \text{ when } m>0;$$

$$\text{New } P_{m_x}=P_{m_x}-(MaxP_{m_x}-P_{m_x})*(m^2*100\%) \text{ when } m<0;$$

$$\text{New } P_{m_y}=P_{m_y}-(P_{m_y}-MinP_{m_y})*(m^2*100\%) \text{ when } m>0; \text{ and}$$

$$\text{New } P_{m_y}=P_{m_y}-(MaxP_{m_y}-P_{m_y})*(m^2*100\%) \text{ when } m<0,$$

where $P_m$ represents an amount of vertical displacement of a point P along the vector curve 802.

In this arch mode, the vector curve 802 is bent away or closer to the horizontal direction line as previously defined. However, the curvature of the original vector curve 802 will be preserved since the vertical displacement is adjusted respectively along each point of the vector curve 802 in the predefined space 814.

Figure 8F:
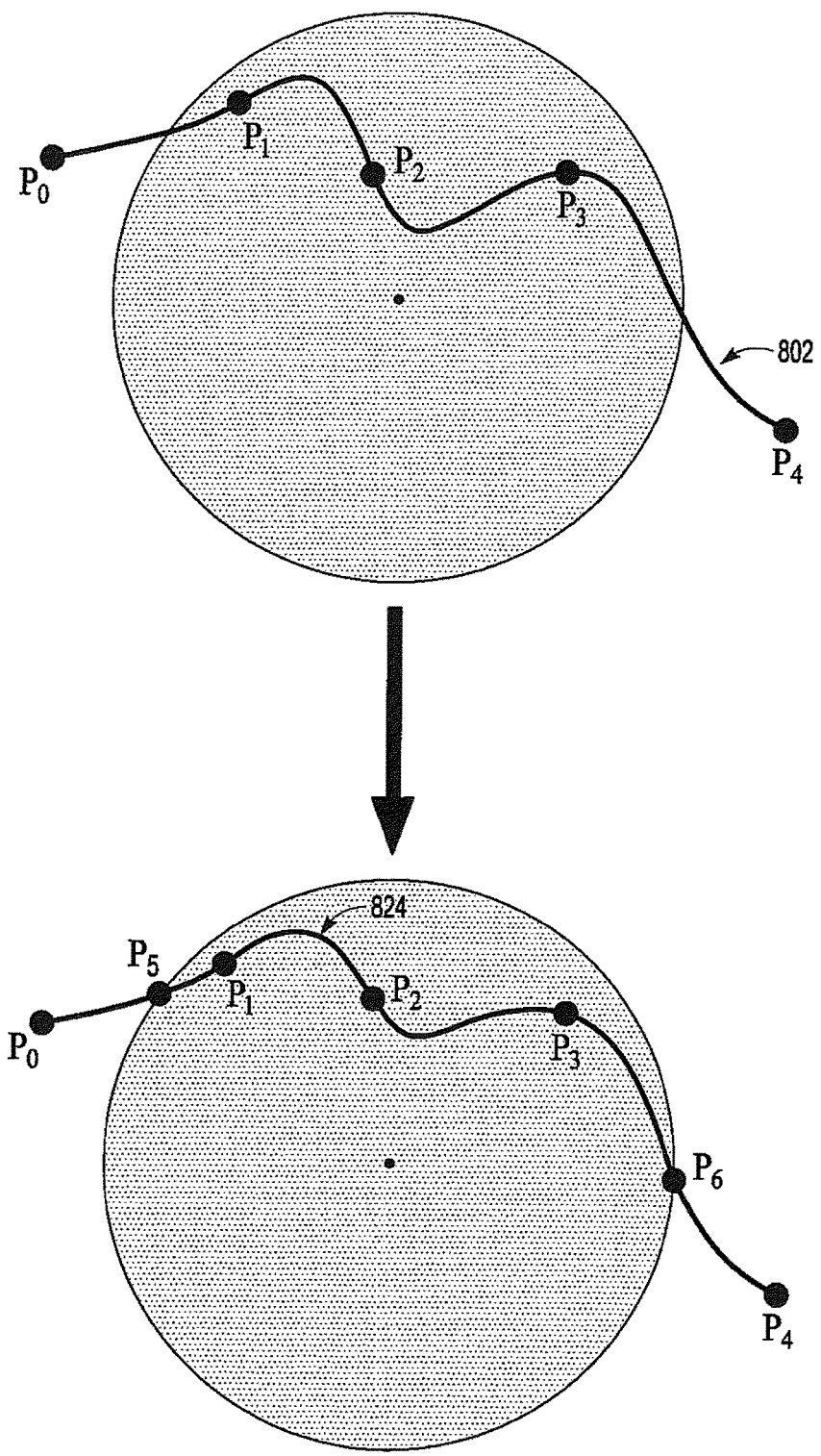

FIG. 8F illustrates the original vector curve 802 modified using the arch mode of the gravity point method drawing to generate a second curve 824.

Figure 9A:
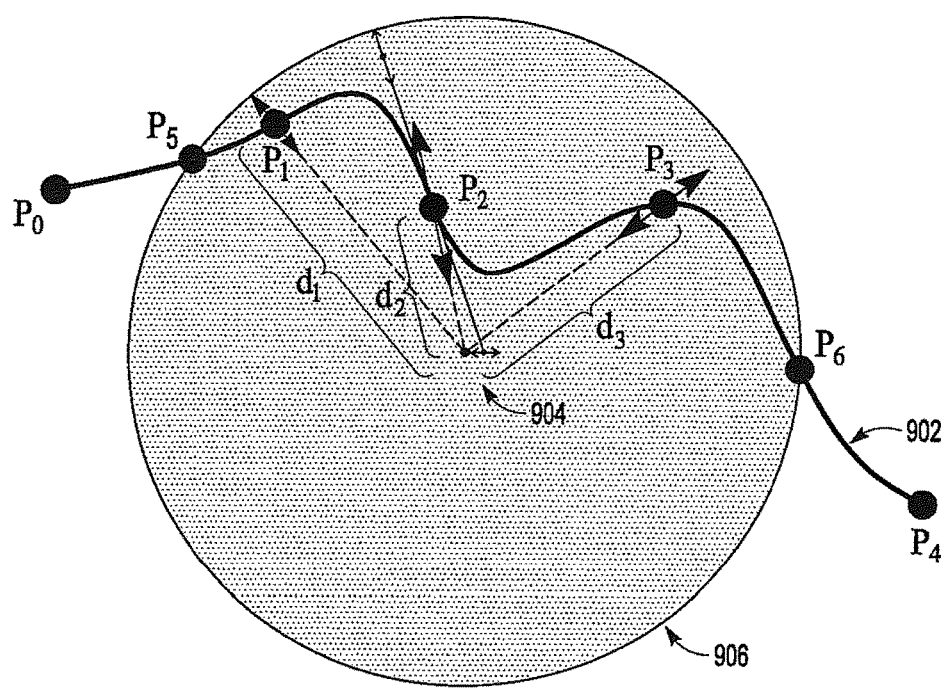
FIGS. 9A-9C illustrate example embodiments of a model for an expand mode modification process of a new vector curve.

FIG. 9A illustrates an example embodiment of a model for an expand mode modification process of an existing vector curve. The expand mode is similar to the previously described arch mode. Similarly, an existing curve 902 intersects with a predefined space 906 associated with a gravity point 904. The existing curve 902 intersects the edge of the predefined space 906 at two intersection points: $P_5$ and $P_6$. The two points $P_5$ and $P_6$ are added to the existing curve 902 as new anchor points.

In the present expand mode, there is no horizontal line. Instead, the respective distance between the anchor points and control points inside the predefined space 906 and the gravity point 904 decide the amount of radial displacement. In this mode, the displacement movement is toward or away from the gravity point 904 along a radial axis of the gravity point 904.

For example, anchor point $P_1$ has a radial distance of $d_1$ from the gravity point 904. Anchor point $P_2$ has a radial distance of $d_2$ from the gravity point 904 and anchor point $P_3$ has a radial distance of $d_3$ from the gravity point 904. Because the radial distance $d_2$ of $P_2$ is less than the radial distance $d_1$ of $P_1$, the displacement of $P_2$ is greater than $P_1$.

Figure 9B:
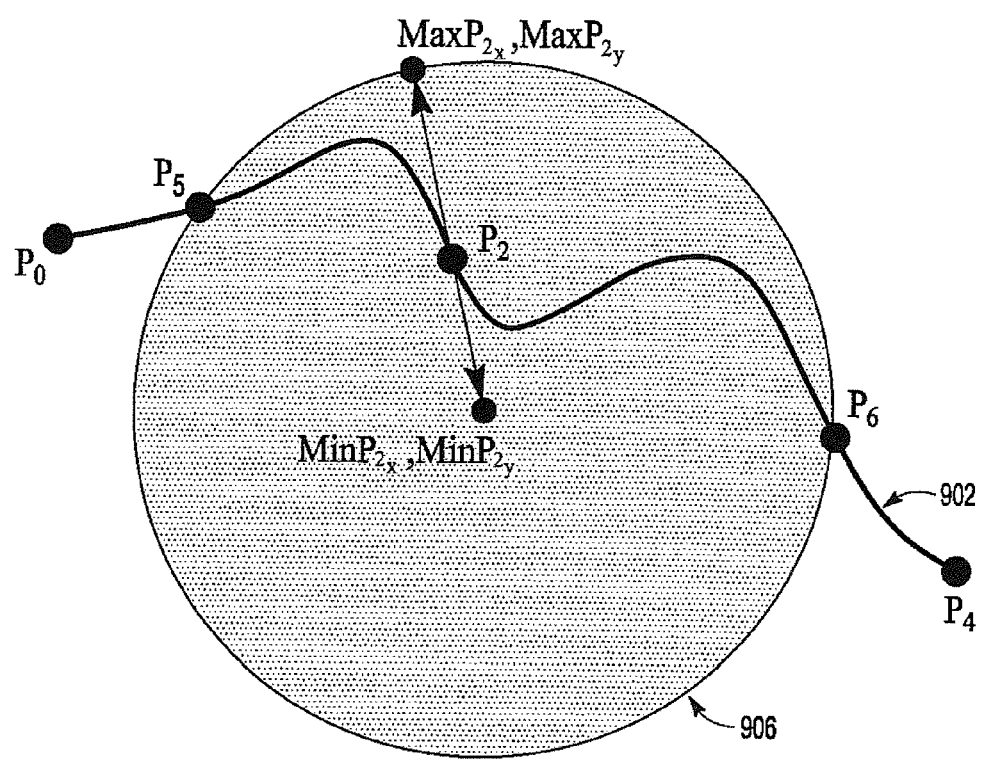

FIG. 9B illustrates a mathematical model for radial displacement of points of the existing curve 902. The maximum vertical displacement of point $P_2$ is represented by $MaxP_{2_x}$ and $MaxP_{2_y}$. The minimum vertical displacement of point $P_2$ is represented by $MinP_{2_x}$ and $MinP_{2_y}$.

The original Bézier curve may be represented as:

$$B(t)=(P_0,P_1,P_2 \ldots P_{(n-2)},P_{(n-1)},P_n).$$

The intersection points may be represented by $P_{(n+1)}$ and $P_{(n+2)}$.

The direction of movement (towards or away from the gravity point) may be represented as:

$$\text{tag}(a){:}(G_x - P_{m_x})/(G_y - P_{m_y}).$$

The radial displacements of the anchor points and control points may be represented as:

$$\text{New } P_{m_x} = P_{m_x} - (P_{m_x} - \text{Min}P_{m_x})*(m^2*100\%) \text{ when } m>0;$$

$$\text{New } P_{m_x} = P_{m_x} - (\text{Max}P_{m_x} - P_{m_x})*(m^2*100\%) \text{ when } m<0;$$

$$\text{New } P_{m_y} = P_{m_y} - (P_{m_y} - \text{Min}P_{m_y})*(m^2*100\%) \text{ when } m>0; \text{ and}$$

$$\text{New } P_{m_y} = P_{m_y} - (\text{Max}P_{m_y} - P_{m_y})*(m^2*100\%) \text{ when } m<0,$$

where $P_m$ represents an amount of radial displacement of a point P along the existing curve 902.

Figure 9C:
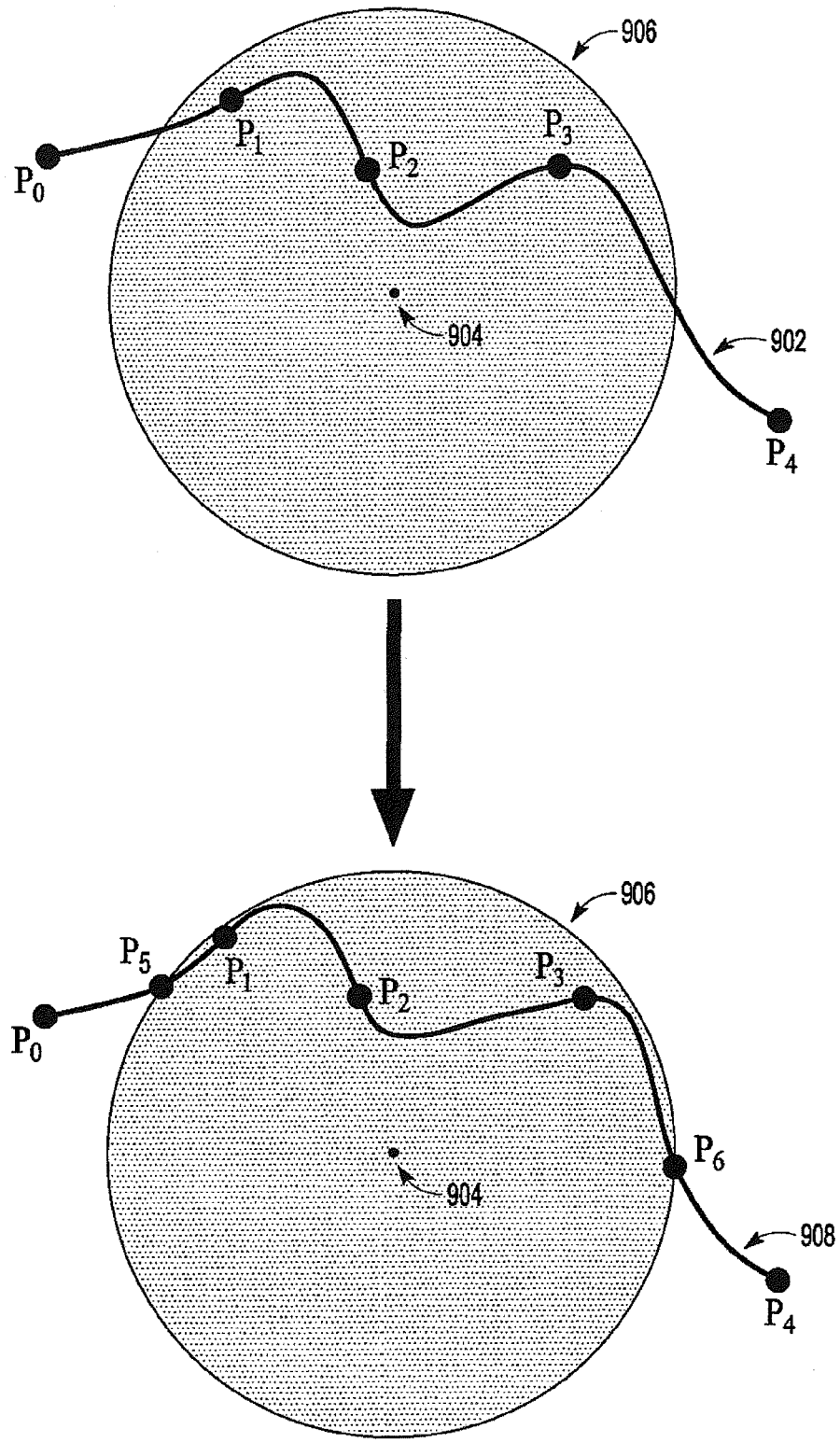

FIG. 9C illustrates the existing curve 902 modified using the arch mode of the gravity point drawing method to generate a second curve 908. In this mode, the distribution of anchor points may be changed. This mode contracts points and curves towards the gravity point 904 or expands them to the edge of the predefined space 906.

As such, by changing the size of the predefined space, a user can choose which part of a curve needs to receive gravity force. Furthermore, by moving a gravity point, a user can choose which part of the curve receives effects.

Figure 10:
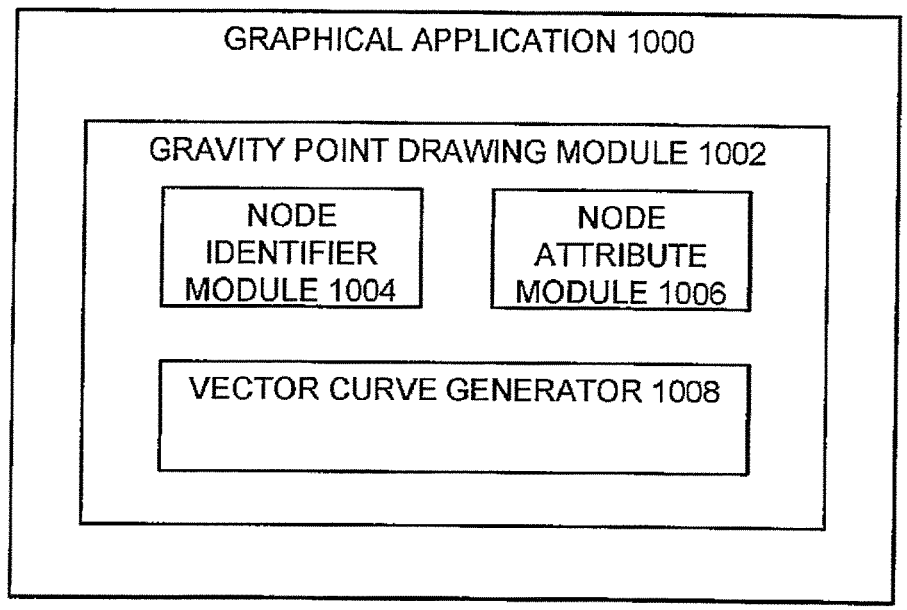
FIG. 10 illustrates a block diagram of an example embodiment of a graphical application.

FIG. 10 illustrates a block diagram of an example embodiment of a graphical application 1000 used to implement the gravity point drawing method as previously described. The graphical application 1000 may be used to generate new vector curves and modify existing vector curves in computer generated drawings.

In one embodiment, the graphical application 1000 comprises a gravity point drawing module 1002, a node identifier module 1004, a node attribute module 1006, and a vector curve generator 1008.

The node identifier module 1004 identifies a node in a drawing of the graphical application 1000. For example, the node identifier module 1004 identifies the gravity point 204 of FIG. 3B as the node.

The node attribute module 1006 determines a size of a predefined space around the node and an intensity value associated with the node. The intensity value affects a curvature of a vector curve in the predefined space. For example, the node attribute module 1006 determines the size of the predefined space 302 around the gravity point 204 in FIG. 3B. The predefined space 302 may be a two-dimensional area or a three-dimensional space. In another embodiment, the predefined space 302 may be a circle or sphere or any user-defined enclosed shape. In other words, the predefined space 302 does not have to be a circle, but can also include other shapes such as a box, a rectangle, or any user-drawn shapes. The intensity value may include the gravitational value associated with the gravity point 204 (e.g., $G_x$ and $G_y$) in FIG. 3B.

The vector curve generator 1008 generates the vector curve in the predefined space (e.g., 302). The curvature of the vector curve may be based on the size of the predefined space (e.g., 302) and the intensity value associated with the node. For example, the curvature of the vector curve 206 is based on the size of the predefined space 302 and the gravitational value of the gravity point 204 (e.g., $G_x$ and $G_y$) in FIG. 3B.

Figure 11:
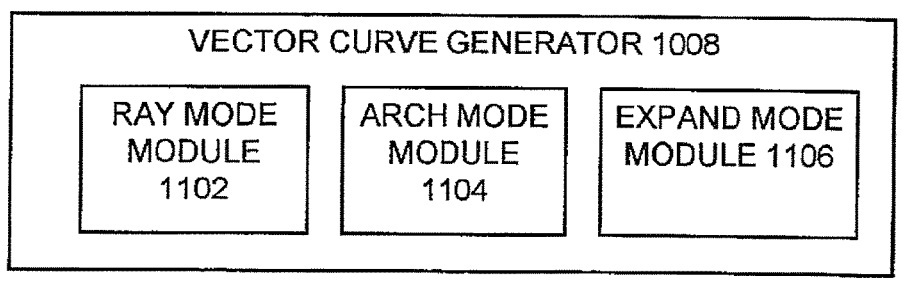
FIG. 11 illustrates a block diagram of an example embodiment of a vector curve generator.

FIG. 11 illustrates a block diagram of an example embodiment of the vector curve generator 1008. The vector curve generator 1008 comprises a ray mode module 1102, an arch mode module 1104, and an expand mode module 1106.

The ray mode module 1102 may generate a physical model vector curve having a curvature based on the intensity value associated with the node as a representation of a measure of gravitational force from the node in the drawing. For example, the curvature of the vector curve 206 is based on the gravitational value of the gravity point 204 and the size of the predefined space 302 in FIG. 3A.

The arch mode module 1104 may generate the vector curve relative to a line segment between a first intersection point found between the existing curve and a perimeter of the predefined space and a second intersection point found between the existing curve and the perimeter of the predefined space. For example, the arch mode module 1104 generates the vector curve 610 relative to the portion of the straight-line segment 604 in FIG. 6A.

The expand mode module 1106 may shift points of an existing curve in the predefined space along an axis perpendicular to a line segment between a first intersection point found between the existing curve and a perimeter of the predefined space and a second intersection point found between the existing curve and the perimeter of the predefined space. For example, the expand mode module 1106 generates the second curve 824 in FIG. 8F.

The expand mode module 1106 may also shift points of an existing curve in the predefined space along a radial axis of the node. For example, the expand mode module 1106 generates the second curve 908 in FIG. 9C.

Figure 12:
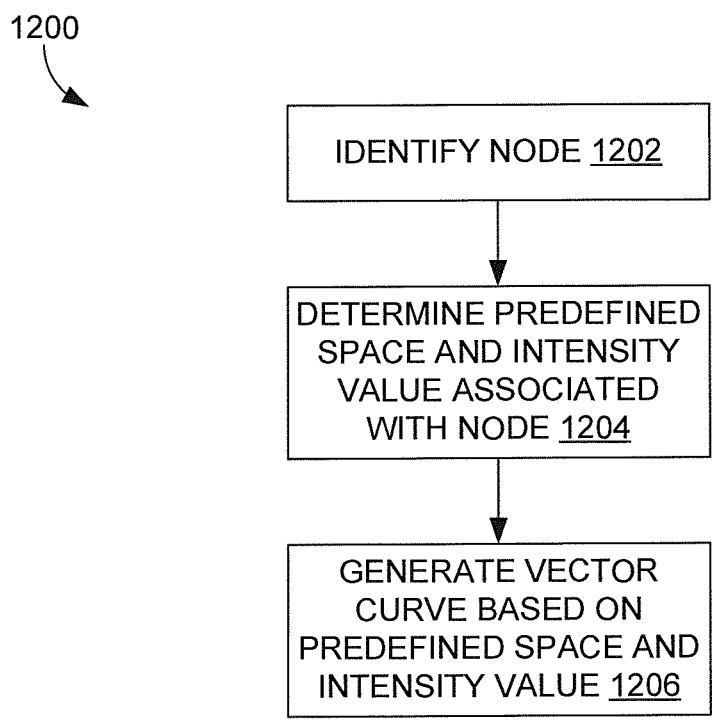
FIG. 12 is a flowchart illustrating an example embodiment of a method for generating a vector curve.

FIG. 12 is a flowchart illustrating an example embodiment of a method 1200 for generating a vector curve. The operations of method 1200 may be performed by a computer system of the graphical application 1000 or modules of the graphical application 1000. At operation 1202, a node is identified in a drawing of a graphical application 1000. The node includes the gravitational point as previously described. In one embodiment, the node identifier module 1004 of FIG. 10 performs this operation.

At operation 1204, the size of a predefined space around the node and an intensity value associated with the node are determined. The intensity value affects the curvature of a vector curve in the predefined space. In one embodiment, the node attribute module 1006 of FIG. 10 performs this operation.

At operation 1206, the vector curve is generated in the predefined space. The curvature of the vector curve is based on the size of the predefined space and the intensity value associated with the node in the drawing. In one embodiment, the vector curve generator 1008 of FIG. 10 performs this operation.

Figure 13:
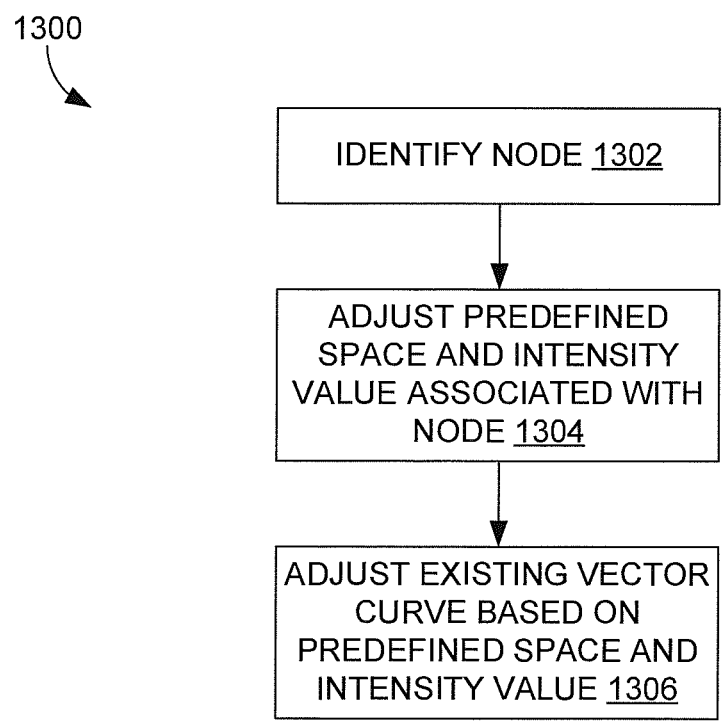
FIG. 13 is a flowchart illustrating another example embodiment of a method for generating a vector curve.

FIG. 13 is a flowchart illustrating another example embodiment of a method for generating a vector curve. At operation 1302, an identification of the node selected by a user of the graphical application is received. In one embodiment, the node identifier module 1004 of FIG. 10 performs this operation.

At operation 1304, the size of the predefined space around the node and the intensity value associated with the node are adjusted to modify a shape of the vector curve in the predefined space. In one embodiment, the vector curve generator 1008 of FIG. 10 performs this operation.

At operation 1306, the curvature of the vector curve is adjusted in the predefined space in the drawing based on the adjusted size of the predefined space and the adjusted intensity value associated with the node. The predefined space comprises a region with the node as a center of the region. In one embodiment, the vector curve generator 1008 of FIG. 10 performs this operation.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. For example, software may accordingly configure a processor to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network and via one or more appropriate interfaces (e.g., APIs).

Electronic Apparatus and System

Example embodiments may be implemented in digital electronic circuitry or in computer hardware, firmware, software, or in combinations of them. Example embodiments may be implemented using a computer program product, (e.g., a computer program tangibly embodied in an information carrier, e.g., in a machine-readable medium for execution by, or to control the operation of, data processing apparatus, e.g., a programmable processor, a computer, or multiple computers).

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and a server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below, are set out hardware (e.g., machine) and software architectures that may be deployed in various example embodiments.

Example Machine Architecture and Machine-Readable Medium

Figure 14:
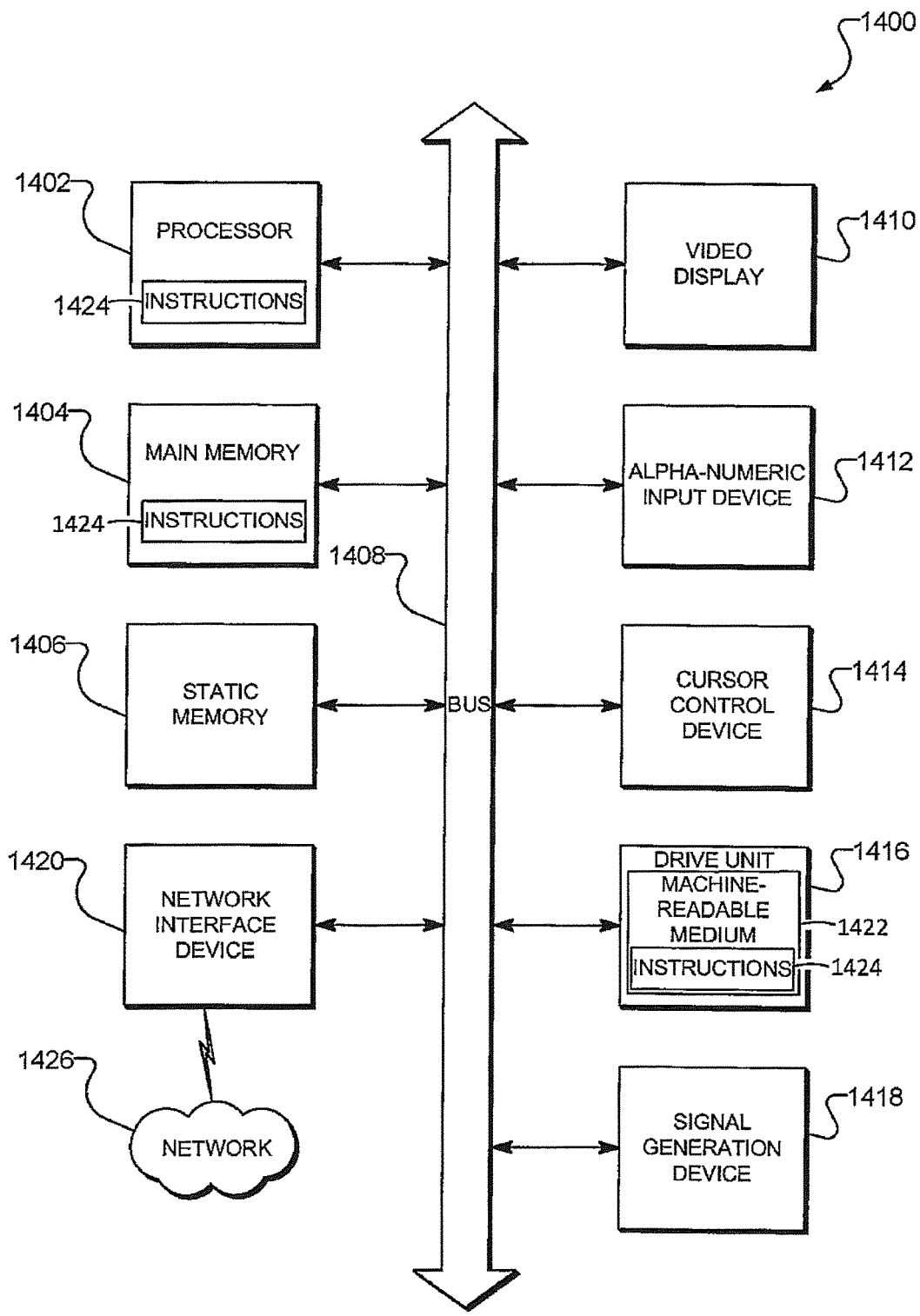
FIG. 14 shows a diagrammatic representation of a machine in the example form of a computer system within which a set of instructions may be executed to cause the machine to perform any one or more of the methodologies discussed herein.

FIG. 14 is a block diagram of a machine in the example form of a computer system 1400 within which instructions (e.g., 1424) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (e.g., 1424—sequential or otherwise) that specify actions to be taken by that machine. Further, while only a single machine is illustrated, the term "machine" shall also be taken to include any collection of machines that individually or jointly execute a set (or multiple sets) of instructions (e.g., 1424) to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a user interface (UI) navigation (or cursor control) device 1414 (e.g., a mouse), a disk drive unit 1416, a signal generation device 1418 (e.g., a speaker) and a network interface device 1420.

Machine-Readable Medium

The disk drive unit 1416 includes a machine-readable medium 1422 on which is stored one or more sets of data structures and instructions 1424 (e.g., software) embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1402 also constituting machine-readable media. The instructions 1424 may also reside, completely or at least partially, within the static memory 1406.

While the machine-readable medium 1422 is shown in an example embodiment to be a single medium, the term "machine-readable medium" may include a single medium or multiple media (e.g., a centralized or distributed database, and/or associated caches and servers) that store the one or more instructions 1424 or data structures. The term "machine-readable medium" shall also be taken to include any tangible medium that is capable of storing, encoding or carrying instructions (e.g., 1424) for execution by the machine and that cause the machine to perform any one or more of the methodologies of the present embodiments, or that is capable of storing, encoding or carrying data structures utilized by or associated with such instructions (e.g., 1424). The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; compact disc-read-only memory (CD-ROM) and digital versatile disc (or digital video disc) read-only memory (DVD-ROM) disks.

Transmission Medium

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks 1426 include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions (e.g., 1424) for execution by the machine, and includes digital or analog communication signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. Therefore, this Detailed Description is not to be taken in a limiting sense, and the scope of various embodiments is defined only by the appended claims along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Although specific embodiments have been illustrated and described herein, it should be appreciated that any arrangement calculated to achieve the same purpose may be substituted for the specific embodiments shown. This disclosure is intended to cover any and all adaptations or variations of several embodiments. Combinations of the above embodiments and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, the inventive subject matter lies in less than all features of a single disclosed embodiment. Thus, the following claims are hereby incorporated into the Detailed Description with each claim standing on its own as a separate embodiment.

Having thus described the invention, what is claimed is:

1. A method comprising:
   identifying a node in a drawing of a graphical application embodied in a processor of a machine;
   determining a size of a predefined space around the node and an intensity value associated with the node, the intensity value affecting a curvature of a vector curve in the predefined space, wherein the node is at a center of the predefined space;
   determining a first intersection point and a second intersection point, the first intersection point comprising a first intersection between the vector curve and a perimeter of the predefined space and the second intersection point comprising a second intersection between the vector curve and the perimeter of the predefined space; and
   shifting, in a direction perpendicular to a line segment between the first intersection point and the second intersection point, a plurality of points on a portion of the vector curve that is in the predefined space, wherein an amount of displacement of a respective point of the plurality of points is based on a distance, measured in a direction parallel to the line segment, between the node and the respective point.

2. The method of claim 1, further comprising:
   receiving an identification of the node selected by a user of the graphical application;
   adjusting the size of the predefined space around the node and the intensity value associated with the node to modify a shape of the vector curve in the predefined space; and
   adjusting the curvature of the vector curve in the predefined space in the drawing based on the adjusted size of the predefined space and the adjusted intensity value associated with the node.

3. The method of claim 1, wherein the predefined space comprises a circular region with the node as the center of the circular region.

4. The method of claim 1, further comprising:
   generating the vector curve using a physical model vector curve having a curvature based on the intensity value associated with the node as a representation of a measure of gravitational force from the node in the drawing in a ray mode.

5. The method of claim 4, further comprising:
   shifting points of an existing curve in the predefined space along a radial axis of the node in an expand mode.

6. The method of claim 4, wherein portions of the vector curve that are outside of the predefined space are not affected by the node in the drawing.

7. The method of claim 1, further comprising:
   increasing the intensity value associated with the node to increase the curvature of the vector curve towards the node in the predefined space;
   decreasing the intensity value associated with the node to decrease the curvature of the vector curve towards the node in the predefined space; and
   adjusting the curvature of the vector curve away from the node in the predefined space when the intensity value is negative.

8. The method of claim 1, further comprising:
   identifying a first node and a second node in the drawing;
   determining a first size of a first predefined space around the first node and a first intensity value associated with the first node, the first intensity value affecting a curvature of a first vector curve in the first predefined space;
   determining a second size of a second predefined space around the second node and a second intensity value associated with the second node, the second intensity value affecting a curvature of a second vector curve in the second predefined space, the first predefined space intersecting the second predefined space to form a common predefined space; and
   generating a common vector curve in the common predefined space, a curvature of the common vector curve based on the size of the first and second predefined spaces and the intensity value associated with the first and second nodes.

9. The method of claim 1, wherein each point of the plurality of points is shifted in the direction perpendicular to the line segment between the first intersection point and the second intersection point.

10. A non-transitory machine-readable storage medium storing instructions which, when executed by at least one processor, are configured to implement a method comprising:
    identifying a node in a drawing of a graphical application;
    determining a size of a predefined space around the node and an intensity value associated with the node, the intensity value affecting a curvature of a vector curve in the predefined space;
    determining a first intersection point and a second intersection point, the first intersection point comprising a first intersection between the vector curve and a perimeter of the predefined space and the second intersection point comprising a second intersection between the vector curve and the perimeter of the predefined space; and
    shifting a plurality of points on a portion of the vector curve that is in the predefined space in a direction that is perpendicular to a line segment between the first intersection point and the second intersection point, wherein an amount of displacement of a respective point of the plurality of points is based on a distance, measured in a direction parallel to the line segment, between the node and the respective point.

11. The storage medium of claim 10, wherein each point of the plurality of points is shifted in the direction perpendicular to the line segment between the first intersection point and the second intersection point.

12. The storage medium of claim 10, wherein the distance between the node and the respective point, measured in the direction parallel to the line segment, comprises a distance between the node and an orthogonal projection of the respective point onto the line segment.

13. A system comprising:
one or more processors; and
one or more computer storage media storing computer-executable instructions that, when executed by the one or more processors, implement a method comprising:
identifying a node in a drawing in a graphical application;
determining a size of a predefined space around the node and an intensity value associated with the node, the intensity value affecting a curvature of a vector curve in the predefined space; and
shifting a plurality of points on a portion of the vector curve that is in the predefined space in a direction perpendicular to a line segment between a first intersection point and a second intersection point, the first intersection point comprising a first intersection between the vector curve and a perimeter of the predefined space and the second intersection point comprising a second intersection between the vector curve and the perimeter of the predefined space, wherein an amount of displacement of a respective point of the plurality of points is based on a distance, measured in a direction parallel to the line segment, between the node and the respective point.

14. The system of claim 13, wherein the distance between the node and the respective point, measured in the direction parallel to the line segment, comprises a distance between the node and an orthogonal projection of the respective point onto the line segment.

15. The system of claim 13, wherein the method further comprises:
receiving an identification of the node selected by a user of the graphical application;
adjusting the size of the predefined space around the node and the intensity value associated with the node to modify a shape of the vector curve in the predefined space; and
adjusting the curvature of the vector curve in the predefined space in the drawing based on the adjusted size of the predefined space and the adjusted intensity value associated with the node.

16. The system of claim 13, wherein the predefined space comprises a region with the node as a center of the region.

17. The system of claim 13, wherein the method further comprises generating the vector curve using a physical model vector curve having a curvature based on the intensity value associated with the node as a representation of a measure of gravitational force from the node in the drawing.

18. The system of claim 13, wherein the method further comprises shifting points of an existing curve in the predefined space along a radial axis of the node.

19. The system of claim 13, wherein the method further comprises:
increasing the intensity value associated with the node to increase the curvature of the vector curve towards the node in the predefined space;
decreasing the intensity value associated with the node to decrease the curvature of the vector curve towards the node in the predefined space; and
adjusting the curvature of the vector curve away from the node in the predefined space when the intensity value is negative.

20. The system of claim 13, wherein the method further comprises:
identifying a first node and a second node in the drawing;
determining a first size of a first predefined space around the first node and a first intensity value associated with the first node, the first intensity value affecting a curvature of a first vector curve in the first predefined space;
determining a second size of a second predefined space around the second node and a second intensity value associated with the second node, the second intensity value affecting a curvature of a second vector curve in the second predefined space, the first predefined space intersecting the second predefined space to form a common predefined space, and
generating a common vector curve in the common predefined space, a curvature of the common vector curve based on the size of the first and second predefined spaces and the intensity value associated with the first and second nodes in the drawing.

* * * * *